(12) United States Patent
Foss

(10) Patent No.: US 7,328,622 B2
(45) Date of Patent: Feb. 12, 2008

(54) SOFT SUPPORT SYSTEMS AND METHODS FOR DYNAMICALLY TESTING STRUCTURES

(75) Inventor: Gary C. Foss, Renton, WA (US)

(73) Assignee: The Boeing Company, Chicago, IL (US)

( * ) Notice: Subject to any disclaimer, the term of this patent is extended or adjusted under 35 U.S.C. 154(b) by 313 days.

(21) Appl. No.: 11/173,584

(22) Filed: Jun. 30, 2005

(65) Prior Publication Data

US 2007/0017293 A1    Jan. 25, 2007

(51) Int. Cl.
*G01M 7/02* (2006.01)
(52) U.S. Cl. .............................. 73/663; 73/583; 73/669; 254/93 HP
(58) Field of Classification Search ................. 73/583, 73/663, 665, 669; 254/93 HP; 248/631
See application file for complete search history.

(56) References Cited

U.S. PATENT DOCUMENTS

| | | | | |
|---|---|---|---|---|
| 3,799,504 A | * | 3/1974 | Vaughen | ................ 254/93 HP |
| 5,506,012 A | * | 4/1996 | Wright et al. | ........... 254/93 HP |
| 6,422,511 B1 | | 7/2002 | Kalisz | |
| 6,619,127 B2 | | 9/2003 | Miller et al. | |

* cited by examiner

*Primary Examiner*—John E Chapman
(74) *Attorney, Agent, or Firm*—Lee & Hayes, PLLC

(57) ABSTRACT

Soft support systems and methods for dynamically testing structures are disclosed. In one embodiment, a soft support system adapted to decouple a structure from a support surface for dynamic testing includes a containment bag, an inflatable chamber disposed at least partially within the containment bag and adapted to engage with a portion of the structure, the inflatable chamber being further adapted to exert a lifting force on the portion of the structure during inflation of the inflatable chamber, and an inflator module coupled to the inflatable chamber and adapted to facilitate inflation of the inflatable chamber within the containment bag. In one embodiment, the inflatable chamber comprises a toroidally-shaped inflatable member defining a central opening adapted to at least partially receive a portion of the structure during inflation of the inflatable chamber.

17 Claims, 6 Drawing Sheets

SOFT SUPPORT SYSTEMS AND METHODS FOR DYNAMICALLY TESTING STRUCTURES

FIELD OF THE INVENTION

This invention relates to dynamic testing of structures, and more specifically, to soft support systems and methods for supporting structures during dynamic tests.

BACKGROUND OF THE INVENTION

Flexible structures, such as aircraft, are potentially prone to wind-induced vibration due to a range of fluid-dynamic effects including vortex shedding, turbulent buffering, galloping and flutter. In many cases the vibrations are limited in magnitude, resulting in increased loads and occupant comfort issues. These effects can be generally taken into account in design. In other cases, however, instabilities may occur that can result in excessive vibration and consequently failure, which should be avoided within the wind speed range likely to be experienced by the structure. To assess the significance of wind-induced dynamics in structural design, specialized studies are required. These specialized studies may include dynamic and modal testing.

One objective of dynamic and modal testing is to measure the dynamic characteristics of a particular structure or test article to confirm and validate a finite element model before operation and production. Ground vibration testing (GVT) is a particular method of measuring the structural dynamic properties of the aircraft or other structure. GVT data are used to validate analytical vibration and flight control models by measuring flight control transfer functions and structural frequency response functions. GVT can be performed by supporting a structure on a support system consisting of a complex arrangement of air shocks and supports, as disclosed, for example, in U.S. Pat. No. 6,619,127 B2 issued to Miller et al., and U.S. Pat. No. 6,422,511 B1 issued to Kalisz. More primitively, GVT may be performed on an aircraft by simply reducing the air pressure in the tires. Reducing the air pressure in the tires, however, may not be the most effective method of testing because the tire construction creates a non-linear spring and the influence is difficult to extract from the results. Similarly, other GVT techniques may produce results, which are contaminated by a series of unknown non-linearities, as well as by test support system non-linearities.

Ideal dynamic testing conditions minimize or eliminate risks to test data associated with test support systems. For example, structures may be tested with fixtures designed to impose a set of boundary conditions on the system, which do not significantly alter the measured data. Finding a suitable fixture with negligible effects on the dynamics of the test structure is often a challenge, especially since most fixtures require a large amount of mass and isolation when connecting a test article. At least one known test method utilizes bungee cords in an effort to provide for a cost-effective fixture. Though the cords may be inexpensive and easy to work with, they are apt to change length and creep over time and they exhibit more damping than an ideal spring. Therefore, although desirable results have been achieved using prior art support systems for dynamic testing of structures, there is room for improvement.

SUMMARY

The present invention is directed to soft support systems and methods for dynamically testing structures. Embodiments of the present invention may provide a convenient and cost-effective soft support system for dynamically testing structures, including ground vibration testing of aircraft and automotive vehicles. Other embodiments of the invention may provide a soft support system with boundary conditions that reduce or minimize the effects of the conditions on the overall results of the test.

In one embodiment, a soft support system adapted to decouple a structure from a support surface for dynamic testing includes a containment bag, an inflatable chamber disposed at least partially within the containment bag and adapted to engage with a portion of the structure, the inflatable chamber being further adapted to exert a lifting force on the portion of the structure during inflation of the inflatable chamber, and an inflator module coupled to the inflatable chamber and adapted to facilitate inflation of the inflatable chamber within the containment bag. In one embodiment, the inflatable chamber comprises a toroidally-shaped inflatable member defining a central opening, the inflatable chamber being adapted to at least partially receive a portion of the structure into the central opening during inflation of the inflatable chamber. In a further embodiment, the inflatable chamber defines a circular central opening having an axis therethrough, the inflatable chamber being adapted to exert the lifting force along the axis during inflation of the inflatable chamber.

BRIEF DESCRIPTION OF THE DRAWINGS

Preferred and alternate embodiments of the present invention are described in detail below with reference to the following drawings.

DETAILED DESCRIPTION

The present invention relates to soft support systems and methods for dynamically testing structures. Many specific details of certain embodiments of the invention are set forth in the following description and in FIGS. 1-8 to provide a thorough understanding of such embodiments. One skilled in the art, however, will understand that the present invention may have additional embodiments, or that the present invention may be practiced without one or more of the details described in the following description.

In general, aspects of the invention may provide a system of dynamically testing structures that decouples the dynamic behavior of structures during testing. Certain aspects of the invention may provide an efficient, soft support system that enables accurate measurements. Further aspects may provide a system of testing the dynamic behavior of structures with relatively minimal effect on the system being tested.

Figure 1:
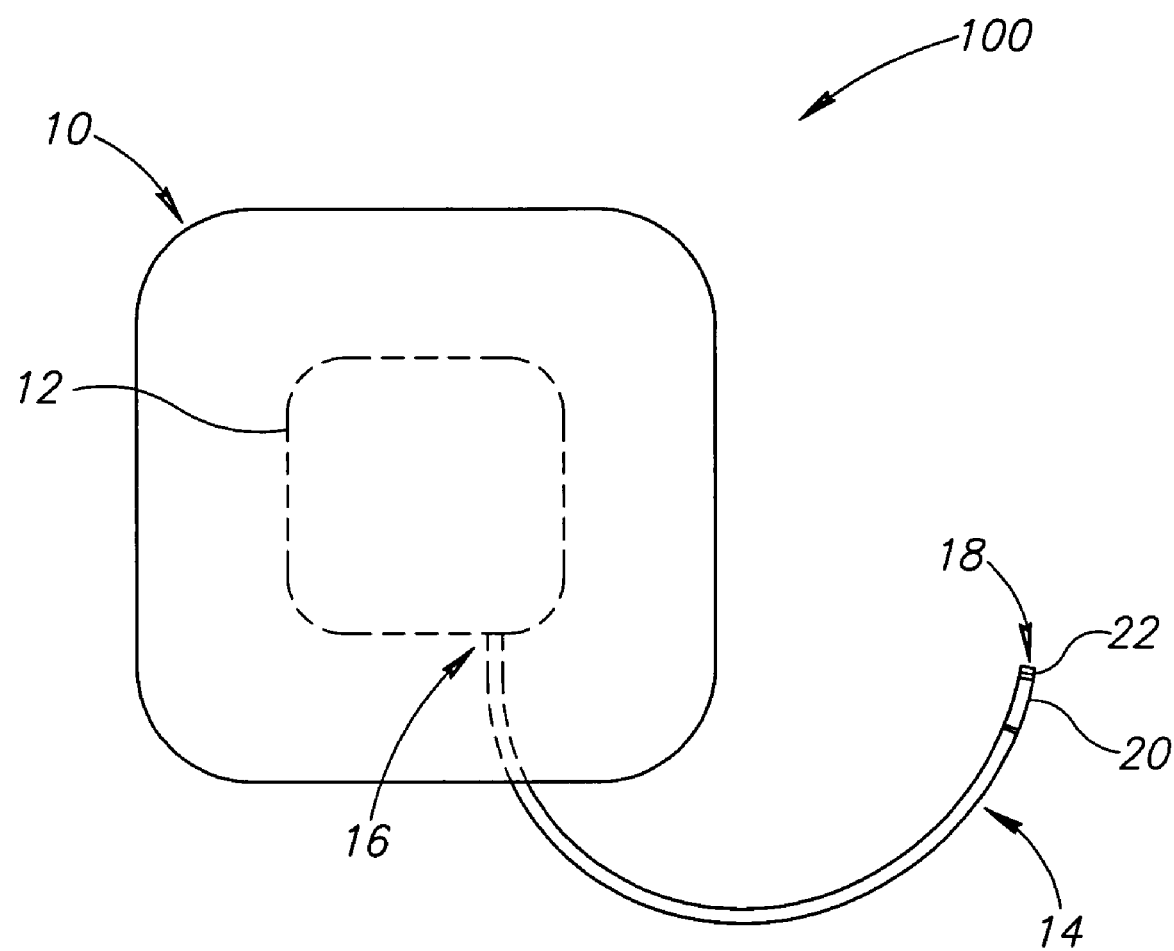
FIG. 1 is a top elevational view of a soft support system for dynamically testing structures, according to an embodiment of the invention.

FIG. 1 is a top elevational view of a soft support system 100 for dynamically testing structures in accordance with an embodiment of the invention. In one aspect, the soft support system 100 comprises a containment bag 10 containing an inflatable chamber 12 and an inflator module 14. The system 100 may be positioned under designated structural support points (not shown) for testing. For example, in aircraft structures, the system 100 may be positioned underneath the aircraft landing assembly. For automobiles, the system 100 may be positioned underneath the tires. The system 100 may be positioned such that the structure is maneuvered on top of one or more of the systems 100 in their resting, uninflated state before testing is performed. The system 100 may then be inflated to raise the structure to a distance above the ground so as to prevent retraction back to the ground once testing is performed. In operation, the soft support system 100 adds relatively little or no additional weight to the supported structure.

In one aspect, the containment bag 10 may comprise an elastic, durable material adapted to adjust to the dynamic behavior of the structure as the system 100 is being inflated, including without limitation, materials such as nylon and canvas. In alternate aspects, the system 100 may comprise shapes and sizes suitable to support the structure or machine being tested. For instance, the system 100 may comprise a toroidal shape large enough to support an aircraft landing assembly. One will appreciate, however, that other suitable shapes and sizes may be applicable depending on the structure being tested.

The inflatable chamber 12 may comprise a rubber bladder or other suitable chamber which may be inflated via the inflator module 14 with air or other suitable fluid or gaseous inflation media using a compressor, a pump, or other suitable inflation source. The inflatable chamber 12 may be adapted to lift the structure being tested upon inflation. In one aspect, the inflator module 14 may comprise a cylindrical tube having a first end 16 and a second end 18. In one aspect, the first end 16 of the inflator module 14 may be coupled to the inflatable chamber 14 contained within the containment bag 10. The second end 18 may extend out of the containment bag 10 and may be coupled to a fitting 20 and a valve 22 adapted for inflating the soft support system 100.

Figure 2:
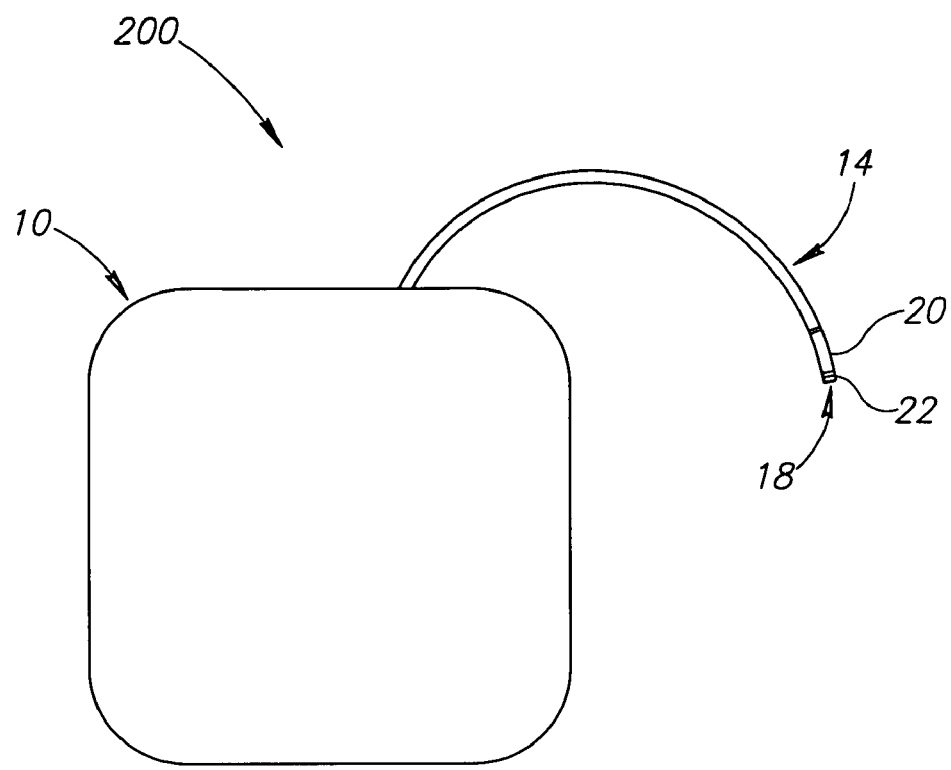
FIG. 2 is a top elevational view of a soft support system for dynamic testing, according to another embodiment of the invention.

FIG. 2 is a top elevational view of a soft support system 200 for dynamically testing structures according to another embodiment of the invention. In one particular aspect, the system 200 may be inflated using an inflator module 14 comprising a first end (not shown) and a second end 18. A fitting 20 and valve 22 may be coupled to the second end 18 of the inflator module 14 which may act to pressurize pneumatic power into an inflatable chamber (not shown) within the containment bag 10 to produce a soft spring within the containment bag 10 and form a soft support system 200.

Figure 3:
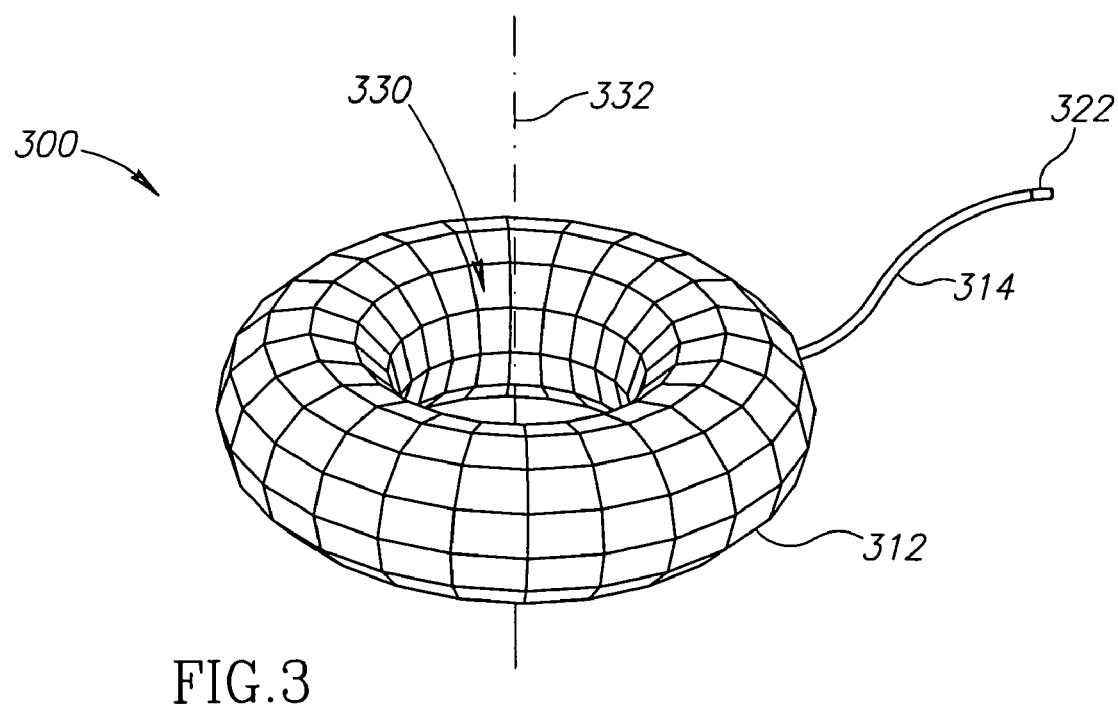
FIG. 3 is a top elevational view of a soft support system according to yet another embodiment of the invention.

FIG. 3 illustrates a top elevational view of a soft support system 300 in accordance with yet another embodiment of the invention. In this embodiment, the system 300 includes a toroidally-shaped inflatable chamber 312 coupled to an inflator module 314. The inflator module 314 includes a valve 322 for filling and sealing the inflatable chamber 312. The inflatable chamber 312 defines a central opening 330 having an axis 332 therethrough. The axis 332 may, for example, be an axis of symmetry of the inflatable chamber 312 and may be normal to and pass through a center of the central opening 330. In an alternate aspect, the inflatable chamber 312 may be contained within a containment bag, similar to the embodiments illustrated in FIGS. 1 and 2.

Figure 4:
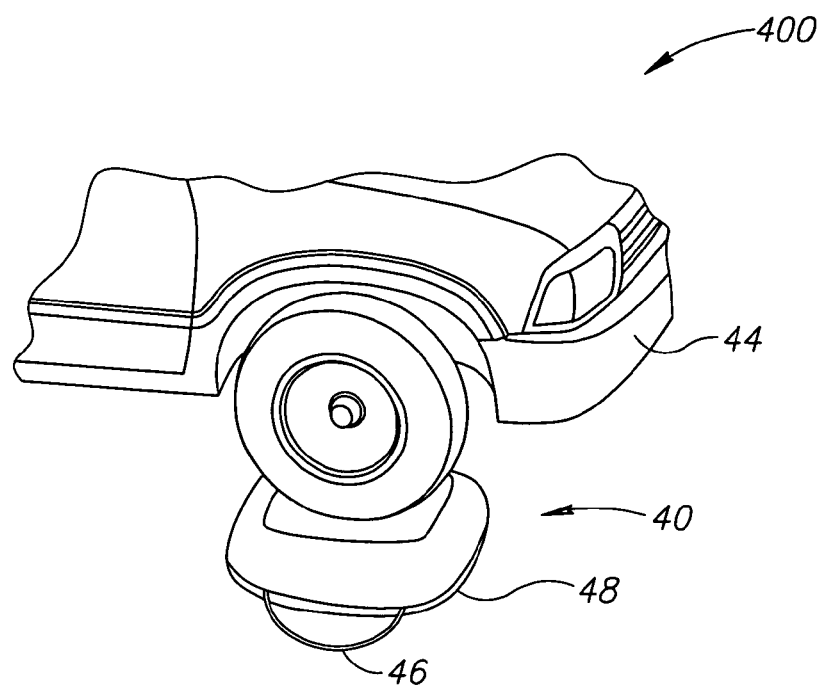
FIG. 4 is an isometric view of a soft support system for dynamic testing positioned underneath a designated support point, according to still another embodiment of the invention.
Figure 5:
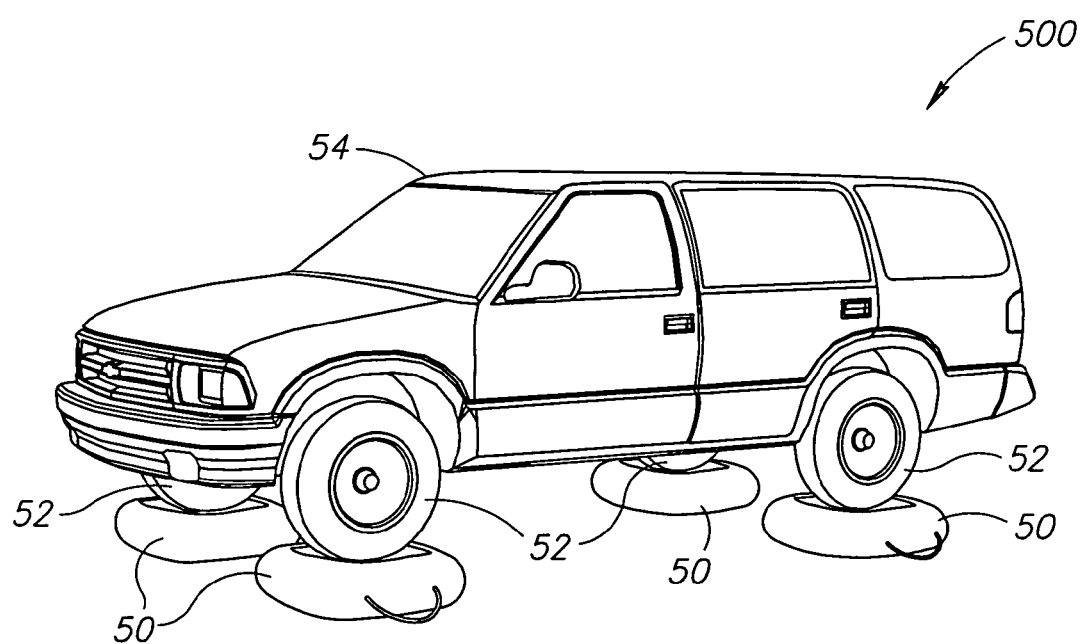
FIG. 5 is an isometric view of an automobile having one or more components in accordance with an aspect of the invention.

Embodiments of the present invention may be used in a wide variety of different systems for conducting dynamic testing. Referring now to FIGS. 4 and 5, FIG. 4 illustrates a side elevational view of a soft support system 400 positioned underneath a designated structural supporting point 42 of a structure 44. In one particular embodiment, the designated structural supporting point 42 may comprise an automobile tire and may be used to lift the structure 44 (i.e. an automobile) for testing. More specifically, an inflator module 46 may inflate an inflatable chamber within a containment bag 48 and to produce a soft spring support system 40. FIG. 5 is an illustration of a plurality of soft support systems 50 underneath a plurality of designated structural supporting points 52 of a structure 54. As shown in FIG. 5, a plurality of support systems 50 may be used for dynamically testing an automobile.

Figure 6:
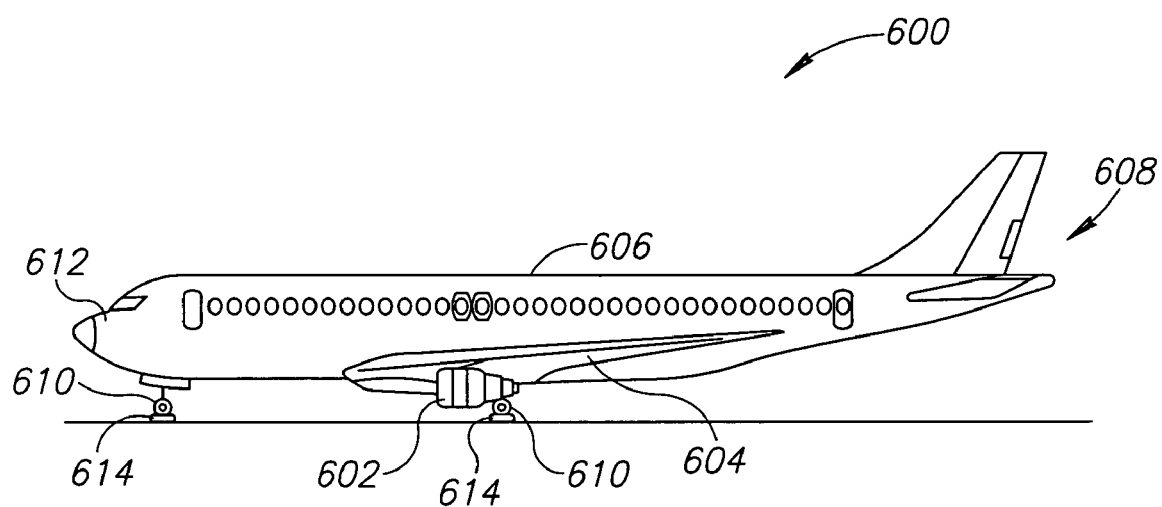
FIG. 6 is a side elevational view of an aircraft having one or more components in accordance with an alternate aspect of the invention.

A side elevational view of an aircraft 600 supported by one or more embodiments of the present invention is shown in FIG. 6. The aircraft 600 includes components and subsystems generally known in the pertinent art, and in the interest of brevity, will not be described in detail. For example, the aircraft 600 generally includes one or more propulsion units 602 that are coupled to wing assemblies 604, or alternately, to a fuselage 606 or even other portions of the aircraft 600. Additionally, the aircraft 600 also includes a tail assembly 608 and a landing assembly 610 coupled to the fuselage 606. The aircraft 600 further includes other systems and subsystems generally required for the proper operation of the aircraft 600. For example, the aircraft 600 includes a flight control system 612 (not shown in FIG. 6), as well as a plurality of other electrical, mechanical and electromechanical systems that cooperatively perform a variety of tasks necessary for the operation of the aircraft 600.

As further shown in FIG. 6, a plurality of soft support systems 614 are positioned under portions of the landing assembly 610. As described above, the soft support systems 614 may be inflated to raise the aircraft 600 off the ground for conducting dynamic structural testing. In one particular embodiment, the soft support systems 614 include toroidally-shaped inflatable chambers 312 (FIG. 3), each inflatable chamber 330 having a central opening 330 with an axis 332 passing therethrough. In operation, the inflation of the inflatable chambers 330 causes the associated wheels of the landing assembly 610 to become partially engaged into the central openings 330, and generates a lifting force on each such wheel of the landing assembly 610. The lifting force exerted by the inflatable chamber 312 on the corresponding wheel of the landing assembly 610 may be at least approximately along the axis 332 through the central opening 330 of each inflatable chamber 312.

Although the aircraft 600 shown in FIG. 6 is generally representative of a commercial passenger aircraft, which may include, for example, the 737, 747, 757, 767 and 777 commercial passenger aircraft available from The Boeing Company of Chicago, Ill., it should be noted that embodiments of the present invention may also be used to support other types of flight vehicles. Examples of such flight vehicles may include manned or unmanned military aircraft, rotary wing aircraft, or ballistic flight vehicles, as illustrated more fully in various descriptive volumes, such as Jane's All The World's Aircraft, available from Jane's Information Group, Ltd. of Coulsdon, Surrey, UK.

Figure 7:
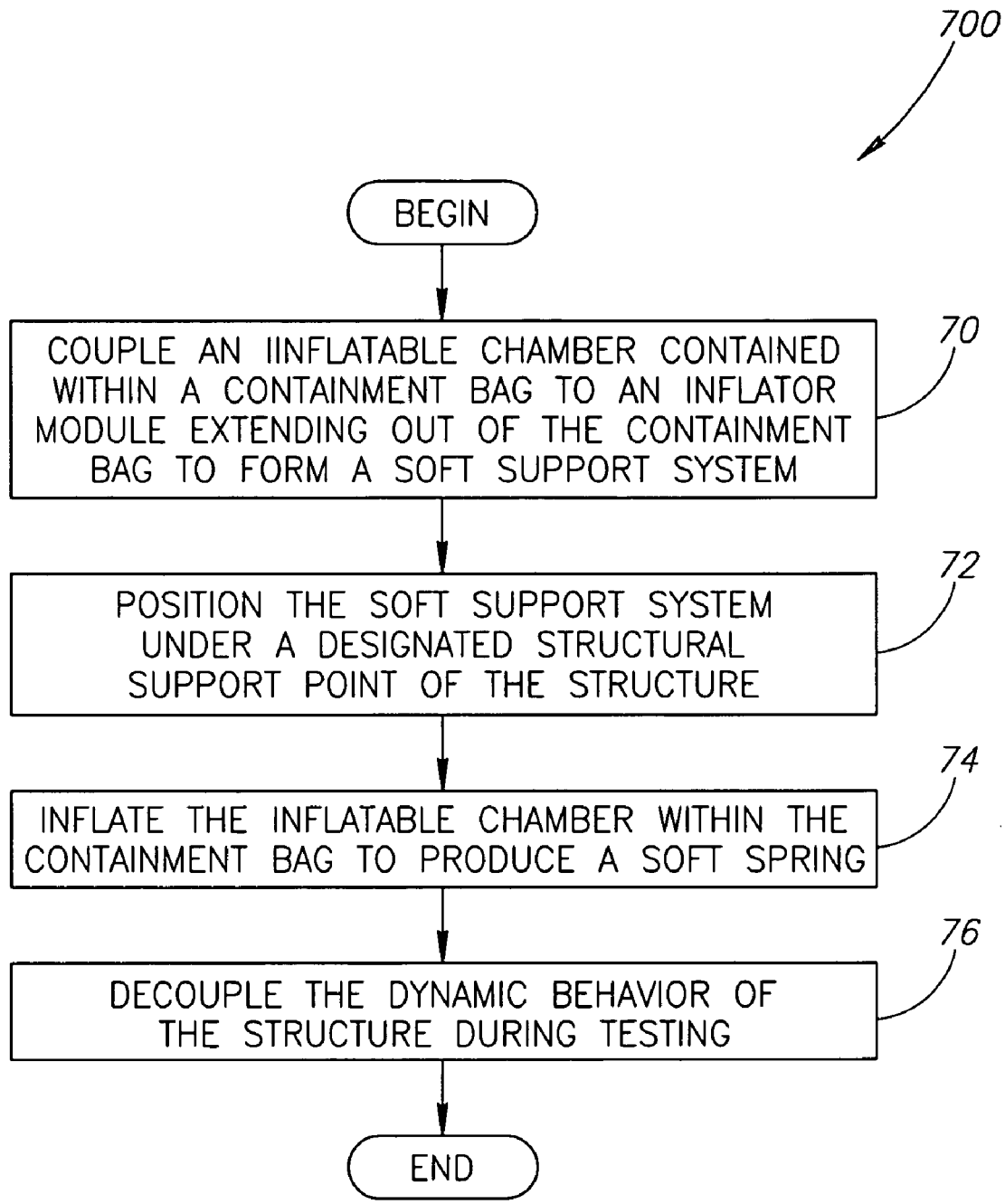
FIG. 7 is a block diagrammatic view of a method of soft support dynamic testing according to yet another aspect of the invention.

FIG. 7 is a block diagrammatic view of a method 700 of performing soft support dynamic testing in accordance with another embodiment of the invention. At a block 70, an inflatable chamber is coupled to an inflator module extending out of a containment bag to form a soft support system. The soft support system is positioned at a block 72, under a designated structural support point. At a block 74, the inflatable chamber is inflated within the containment bag to produce a soft spring. In one particular embodiment, the inflatable chamber of the soft support system may be a toroidally-shaped inflatable chamber (FIG. 3), such that as the inflatable chamber is inflated, the designated structural support point becomes at least partially engaged into a central opening of the inflatable chamber. Furthermore, as the toroidally-shaped inflatable chamber is inflated, a lifting force may be generated on the designated structural support point (e.g. a wheel of an aircraft landing assembly). The lifting force exerted by the inflatable chamber may be at least approximately along an axis through the central opening of the inflatable chamber.

The dynamic behavior of the structure during dynamic testing is decoupled at a block 76. As the term is used herein, decoupling may refer to the decrease or elimination of shock waves and other dynamic behavior of the structure caused by the support system during testing. In one aspect, the dynamic behavior of the structure may be decoupled by adjusting the soft spring to the structure as it moves during testing.

Figure 8:
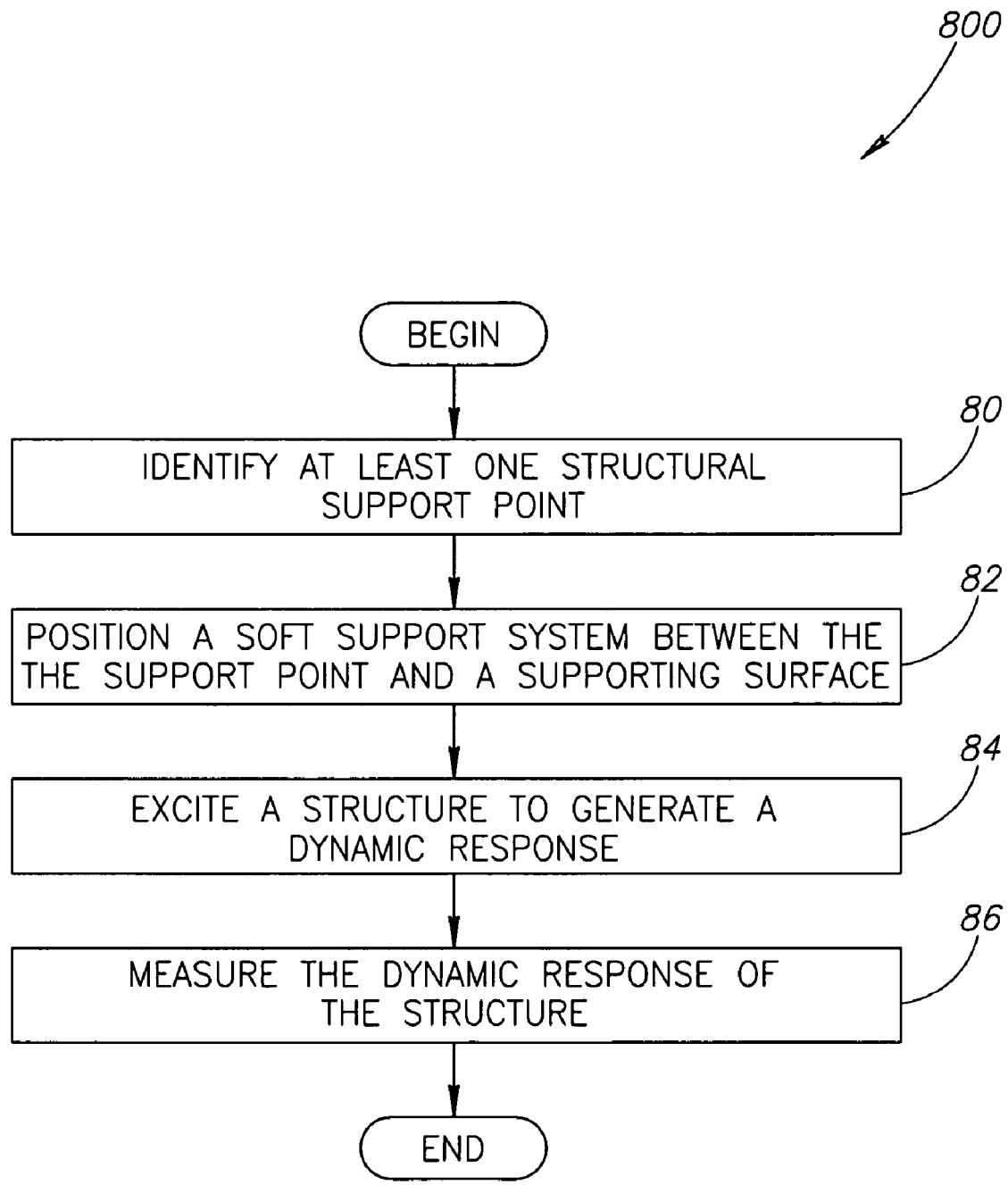
FIG. 8 is a block diagrammatic view of a method of soft support dynamic testing according to still another aspect of the invention.

FIG. 8 is a block diagrammatic view of a method of dynamically testing a structure in accordance with an alternate embodiment of the invention. In this embodiment, at least one structural support point is identified at a block 80. A soft support system is positioned at a block 82 between the support point and a supporting surface and is inflated to decouple the structural support point from the ground. As noted above, in one particular embodiment, the soft support system includes a toroidally-shaped inflatable chamber (FIG. 3), such that as the inflatable chamber is inflated, the structural support point becomes at least partially engaged into a central opening of the inflatable chamber, and a lifting force is exerted on structural support point. The lifting force may be at least approximately along an axis through the central opening of the inflatable chamber.

The structure is excited at a block 84 to generate a dynamic response in the structure. The dynamic response is measured at a block 86. Dynamic testing may be performed by exciting the structure to generate a dynamic response. Exciting the structure may include providing a predetermined force input, such as periodic or non-periodic force. Testing may include measuring the dynamic response of the structure, including dynamic information such as resonant frequencies, modal changes and other desired information.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A soft support system adapted to decouple a structure from a support surface for dynamic testing, comprising:
   a containment bag;
   a toroidally-shaped inflatable chamber disposed at least partially within the containment bag, the toroidally-shaped inflatable chamber being adapted to at least partially receive a portion of the structure into a central opening during inflation of the inflatable chamber, the toroidally-shaped inflatable chamber being further adapted to exert a lifting force on the portion of the structure during inflation of the toroidally-shaped inflatable chamber;
   an inflator module coupled to the toroidally-shaped inflatable chamber and adapted to facilitate inflation of the toroidally-shaped inflatable chamber within the containment bag;
   a means for dynamically exciting the structure to generate a dynamic response; and
   a means for measuring the dynamic response.

2. The system of claim 1, wherein the containment bag comprises at least one material selected from a group consisting of nylon and canvas.

3. The system of claim 1, wherein the toroidally-shaped inflatable chamber defines a circular central opening having an axis therethrough, the toroidally-shaped inflatable chamber being adapted to exert the lifting force along the axis during inflation of the toroidally-shaped inflatable chamber.

4. The system of claim 1, wherein the toroidally-shaped inflatable chamber's stiffness is adjustable to adapt to the dynamic behavior of the structure during dynamic testing.

5. The system of claim 1, wherein the inflator module comprises a first end and a second end, the first end coupled to the toroidally-shaped inflatable chamber and the second end coupled to a fitting and a valve.

6. The system of claim 5, further comprising a valve adapted to pressurize air into the inflator module and inflate the toroidally-shaped inflatable chamber contained within the containment bag.

7. A method of soft support dynamic testing of a structure, comprising:
   coupling a toroidally-shaped inflatable chamber contained within a containment bag to an inflator module extending out of the containment bag to form a soft support system, the toroidally-shaped inflatable chamber defining a central opening, the toroidally-shaped inflatable chamber being adapted to at least partially receive a portion of the structure into the central opening during inflation of the toroidally-shaped inflatable chamber;
   positioning the soft support system under at least one designated structural support point;
   inflating the toroidally-shaped chamber contained within the containment bag to produce a soft spring; and
   decoupling a dynamic behavior of the structure during testing.

8. The method of claim 7, wherein the toroidally-shaped inflatable chamber defines a circular central opening having an axis therethrough, and wherein inflating the toroidally-shaped chamber includes inflating the toroidally-shaped chamber to exert a lifting force on the structure along the axis.

9. The method of claim 7, wherein positioning the soft support system under a designated structural support point includes positioning the soft support system underneath a landing assembly of a flight vehicle.

10. The method of claim 7, wherein positioning the soft support system under a designated support point includes positioning the soft support system underneath an automobile tire.

11. The method of claim 7, wherein inflating the toroidally-shaped chamber includes inflating the toroidally-shaped chamber with a pneumatic pressure.

12. The method of claim 7, wherein decoupling dynamic behavior includes adjusting the soft spring to the movement of the structure during dynamic testing.

13. The method of claim 12, wherein dynamic testing includes modal testing, including ground vibration testing.

14. A method of dynamically testing a structure, comprising:
- identifying at least one structural support point;
- positioning a toroidally-shaped inflatable member between the support point and a supporting surface, the toroidally-shaped inflatable member defining a central opening and being adapted to at least partially receive a portion of the structural support point into the central opening during inflation of the toroidally-shaped inflatable member;
- inflating the toroidally-shaped inflatable member to exert a lifting force on the support point;
- exciting the structure to generate a dynamic response; and
- measuring the dynamic response of the structure.

15. The method of claim 14, wherein positioning the toroidally-shaped inflatable member between the support point and the supporting surface further comprises positioning the toroidally-shaped inflatable member between the support point and the supporting surface, the toroidally-shaped inflatable member defining a circular central opening having an axis therethrough, and wherein inflating the toroidally-shaped inflatable member includes inflating the toroidally-shaped inflatable member to exert a lifting force on the structure along the axis.

16. The method of claim 14, wherein exciting the structure to generate the dynamic response comprises providing at least one of a periodic or a non-periodic force.

17. The method of claim 14, further comprising processing the dynamic response of the structure to determine at least one of a resonant frequency or a modal change of the structure.

* * * * *